(12) United States Patent
Sakaguchi

(10) Patent No.: US 7,195,720 B2
(45) Date of Patent: Mar. 27, 2007

(54) CURABLE COMPOSITION FOR HEAT CONDUCTIVE MATERIAL

(75) Inventor: Masashi Sakaguchi, Kako-gun (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/361,567

(22) Filed: Feb. 11, 2003

(65) Prior Publication Data

US 2003/0160207 A1   Aug. 28, 2003

(30) Foreign Application Priority Data

Feb. 20, 2002  (JP) .................... P2002-042771

(51) Int. Cl.
C08L 25/02 (2006.01)
C08L 83/16 (2006.01)
C08J 3/20 (2006.01)

(52) U.S. Cl. .................. 252/500; 252/71; 252/72; 252/511; 252/514; 252/516; 252/518.1; 528/18; 528/20; 528/22; 528/25; 525/105; 525/106; 525/100; 524/265; 524/405; 524/426; 524/506; 264/478; 264/464; 257/712; 156/325; 156/336

(58) Field of Classification Search ................. 252/71, 252/73; 528/18, 20, 22; 525/105, 106, 100
See application file for complete search history.

(56) References Cited

U.S. PATENT DOCUMENTS

| | | | |
|---|---|---|---|
| 3,159,601 A | 12/1964 | Ashby | 260/46.5 |
| 3,159,662 A | 12/1964 | Ashby | 260/448.2 |
| 3,220,972 A | 11/1965 | Lamoreaux | 260/46.5 |
| 4,316,973 A | 2/1982 | Kennedy | 525/335 |
| 4,758,631 A | 7/1988 | Kennedy et al. | 525/245 |
| 4,837,274 A * | 6/1989 | Kawakubo et al. | 525/100 |
| 5,451,637 A * | 9/1995 | Leibfried | 525/105 |
| 5,627,252 A * | 5/1997 | De La Croi Habimana | 528/26 |
| 5,690,860 A * | 11/1997 | LeGrow | 516/33 |
| 5,808,127 A * | 9/1998 | Nakagawa et al. | 556/479 |
| 6,035,172 A * | 3/2000 | Mimura et al. | 399/286 |
| 6,132,874 A * | 10/2000 | Fischer et al. | 428/405 |
| 6,335,412 B1 * | 1/2002 | Okamoto et al. | 528/18 |
| 6,555,620 B1 * | 4/2003 | Manabe et al. | 525/106 |
| 6,773,758 B2 * | 8/2004 | Yamanaka | 427/407.1 |

FOREIGN PATENT DOCUMENTS

| | | |
|---|---|---|
| EP | 0 850 997 A2 | 1/1998 |
| EP | 0 911 704 A1 | 4/1999 |
| EP | 0 999 236 A1 | 5/2000 |
| EP | WO 01/00727 A1 | 1/2001 |
| EP | 1 167 457 A2 | 1/2002 |
| JP | 3-152164 | 6/1991 |
| JP | 4-288309 | 10/1992 |
| JP | 6-38460 | 5/1994 |
| JP | 6-55891 | 7/1994 |
| JP | 7-91468 | 10/1995 |
| JP | 7-304969 | 11/1995 |
| JP | 2000-302975 | 10/2000 |
| JP | 2001-139733 | 5/2001 |
| JP | 2001-240756 | 9/2001 |
| JP | 2001-302936 | 10/2001 |

OTHER PUBLICATIONS

NIH-Report, "Silica, Crystalline," Report on Carcinogens, 1991, Eleventh Edition, pp. 2.*
Katz, Harry S., et al. (eds.), *Handbook of Fillers and Reinforcements for Plastics*, Van Nostrand Reinhold Company, 1978, Chapter 8, pp. 136-159.

* cited by examiner

*Primary Examiner*—Mark Kopec
*Assistant Examiner*—Kallambella Vijayakumar
(74) *Attorney, Agent, or Firm*—Kenyon & Kenyon LLP

(57) ABSTRACT

The invention provides a curable composition for a heat conductive material, having an excellent durability, a satisfactory heat conductive property and a high productivity with easily controllable surface tackiness, a heat conductive material obtained from such curable composition and a method for controlling the surface tackiness of the composition after curing. The curable composition for the heat conductive material is formed by a curable composition of heat curable type based on crosslinking by a hydrosilylation reaction and including a saturated hydrocarbon polymer containing at least an alkenyl group in a molecule, a curing agent containing at least two hydrosilyl groups in a molecule and a hydrosilylation catalyst, to which a heat conductive filler is incorporated, thereby providing a flexible elastomer with a satisfactory heat conductivity and with an easily controllable surface tackiness.

15 Claims, No Drawings

CURABLE COMPOSITION FOR HEAT CONDUCTIVE MATERIAL

BACKGROUND OF THE INVENTION

1. Field of the Invention

The present invention relates to a curable composition for a heat conductive material, capable of forming a heat conductive elastomer of a satisfactory heat conductive property in a saturated hydrocarbon polymer cured by a hydrosilylation reaction, and the cured material.

2. Description of the Related Art

Heat conductive material with elasticity is already widely employed as a heat radiating or heat conducting spacer, for example, in electronic components such as various heaters, a temperature sensor, or semiconductor devices such as a transistor, a diode or an IC. For example, JP-A-2001-139733 (Japanese Kokai Publication) discloses a composition including a heat conductive filler in a known base rubber such as silicone rubber or EPDM rubber, and a technology for achieving a high filling rate of the heat conductive filler.

Also the substance utilizing silicone rubber is well known. For example, JP-B-6-55891 (Japanese Kokoku Publication), JP-B-6-38460 (Japanese Kokoku Publication) and JP-B-7-91468 (Japanese Kokoku Publication) disclose technologies based on a combination of various heat conductive fillers and silicone rubber.

In such material intended for heat conduction, not only the heat conductivity of the material itself but also its adhesion property to a substrate are considered important. For achieving such adhesion to a substrate, an adhesion property to the surface of the substrate, an adaptability to the shape of the substrate and a deformation thereof are important. A material with elasticity is considered to be preferred, particularly for deformation. Also, it is easiest to apply the material to the substrate in a liquid form such as an adhesive material or a potting material on a position of use and then to cure such material.

On the other hand, a method of applying a heat conductive material in the form of a sheet or a tape is advantageous in productivity, and is employed more frequently. In such cases, the adhesion is secured by providing an adhesion layer or a tacking layer separately, or by developing a surface tackiness. Also in the aforementioned case of application in a liquid form followed by curing, the surface tackiness is desired, for example, in cases where a heat radiating fin or the like is adhered onto a cured material.

The heat conductive material is usually added with a heat conductive filler at a high filling rate in order to improve the heat conductivity. But such addition of the filler at a higher filling rate tends to cause the material to lose elasticity and decrease surface tackiness, whereby the adhesion property to the substrate is deteriorated.

On the other hand, the aforementioned method of providing the adhesion layer or the tacking layer at a lower filling rate is effective in lessening the influence of the filling rate on the surface property of the material, but requires a new step of forming such a layer, thereby being inferior in productivity.

JP-A-2001-302936 (Japanese Kokai Publication) discloses that a resin composition formed by adding a heat conductive filler to a substrate of a compound having a hydrolyzable silyl group, such as polyalkylene glycol or polyisobutylene, has excellent strength and adhesivity. However there is not particularly disclosed a method for controlling the adhesivity. And the method that is disclosed is associated with a drawback of inferior productivity, since the curing is based on moisture curing and requires several hours or longer for completion.

SUMMARY OF THE INVENTION

The present invention provides a curable composition for a heat conductive material, having a high productivity, an excellent durability and a satisfactory heat conducting property, and a cured material thereof.

It has been found that the aforementioned drawbacks can be solved by adding a heat conductive filler to a material which is formed by crosslinking in a hydrosilylation reaction. The material includes a saturated hydrocarbon polymer containing at least one alkenyl group capable of hydrosilylation reaction in a molecule and a curing agent containing at least two hydrosilyl groups in a molecule and is capable of thereafter forming an elastomer, thereby attaining the present invention.

More specifically, the present invention relates to a curable composition for a heat conductive material, comprising the following components (A), (B), (C) and (D):

(A) a saturated hydrocarbon polymer including at least one alkenyl group in a molecule;

(B) a curing agent including at least two hydrosilyl groups in a molecule;

(C) a hydrosilylation catalyst; and (D) a heat conductive filler.

In a preferred embodiment, the curable composition for the heat conductive material further includes a component (E):

(E) a plasticizer in addition to the components (A) to (D).

In a further preferred embodiment of the curable composition for the heat conductive material, the saturated hydrocarbon polymer of the component (A) is a polyisobutylene polymer.

In a further preferred embodiment of the curable composition for the heat conductive material, the curing agent of the component (B) is polyorganohydrogen polysiloxane including at least two hydrosilyl groups in a molecule.

In a further preferred embodiment of the curable composition for the heat conductive material, the heat conductive filler of the component (D) is at least one selected from metal oxide, metal nitride, metal carbide, metal hydroxide, crystalline silica and metal.

In a further preferred embodiment of the curable composition for the heat conductive material, the component (D) content of the entire composition is not less than 25 vol. %.

In a further preferred embodiment of the curable composition for the heat conductive material, a molar ratio of an amount of the hydrosilyl groups in the component (B) to an amount of the alkenyl groups in the component (A) is in a range from 1:0.5 to 1:5.

In a further preferred embodiment of the curable composition for the heat conductive material, an average number of the hydrosilyl groups contained per molecule of the curing agent of the employed component (B) is selected within a range of 2 to 40 units.

Also the present invention relates to a cured material for a heat conductive material obtained from the curable composition.

In a preferred embodiment of the cured material for a heat conductive material, the cured material is a molded article.

DESCRIPTION OF THE PREFERRED EMBODIMENTS

The component (A) to be employed in the present invention is a saturated hydrocarbon polymer having at least one alkenyl group capable of hydrosilylation reaction in a molecule. The saturated hydrocarbon polymer may be a polymer which is substantially free from a carbon-carbon unsaturated bond other than an aromatic ring, and of which a repeating unit constituting a main chain other than the aforementioned alkenyl group is constituted by a hydrocarbon group. It is however permitted that a main chain skeleton includes carbon-carbon double bonds in a small amount within a range not deteriorating the durability, which is one of the objectives of the invention, preferably within a range not exceeding 10 wt. %.

Also the alkenyl group is not particularly restricted but can be any groups including a carbon-carbon double bond active to the hydrosilylation reaction. Examples of the alkenyl group include an aliphatic unsaturated hydrocarbon group such as a vinyl group, an allyl group, a methylvinyl group, a propenyl group, a butenyl group, a pentenyl group or hexenyl group; a cyclic unsaturated hydrocarbon group such as a cyclopropenyl group, a cyclobutenyl group, a cyclopentenyl group or a cyclohexenyl group; or a methacryl group. Among these, there is preferred an allyl group in consideration of a high activity for the hydrosilylation reaction and ease of introduction of the alkenyl group.

In the component (A) in the invention, the alkenyl group capable of hydrosilylation reaction may be provided at an end of a main chain of the saturated hydrocarbon polymer, on a side chain thereof, or on both. In particular, the alkenyl group is preferably present at an end of the main chain because it is easier to obtain a rubber-like cured substance with a high strength and a high elongation as an amount of the effective crosslinking chain increases in the saturated hydrocarbon polymer component contained in the finally formed cured substance.

A polymer constituting the skeleton of the saturated hydrocarbon polymer of the component (A) can be obtained by (1) polymerizing an olefinic compound with 2 to 6 carbon atoms such as ethylene, propylene, 1-butene or isobutylene as a principal component, or (2) homopolymerizing a dienic compound such as butadiene or isoprene or copolymerizing an aforementioned olefinic compound and a dienic compound, followed by hydrogeneration. The polymer is preferably an isobutylene polymer, a hydrogenated polybutadiene polymer or a hydrogenated polyisoprene polymer in consideration of ease of introduction of a functional group at an end, ease of control of the molecular weight and possibility of an increase in the number of terminal functional groups.

In the isobutylene polymer, all the monomer units may be formed by an isobutylene unit or a monomer unit copolymerizable with isobutylene, which may be contained in an amount preferably 50 wt. % or less, more preferably 30 wt. % or less and particularly preferably 20 wt. % or less.

Such a monomer component can be, for example, an olefin with 4 to 12 carbon atoms, a vinyl ether, an aromatic vinyl compound, a vinylsilane or an allylsilane. Specific examples of such copolymer components include 1-butene, 2-butene, 2-methyl-1-butene, 3-methyl-1-butene, pentene, 4-methyl-1-pentene, hexene, vinylcyclohexane, methyl vinyl ether, ethyl vinyl ether, isobutyl vinyl ether, styrene, α-methylstyrene, dimethylstyrene, p-t-butoxystyrene, p-hexenyloxystyrene, p-allyloxystyrene, p-hydroxystyrene, β-pinene, indene, vinyldimethylmethoxysilane, vinyltrimethylsilane, divinyldimethoxysilane, divinyldimethylsilane, 1,3-divinyl-1,1,3,3-tetramethyldisiloxane, trivinylmethylsilane, tetravinylsilane, allyldimethylmethoxysilane, allyltrimethylsilane, diallyldimethoxysilane, diallyldimethylsilane, γ-methacryloyloxypropyltrimethoxysilane, and γ-methacryloyloxypropylmethyldimethoxysilane.

Also in the aforementioned hydrogenated polybutadiene polymer or other saturated hydrocarbon polymers, there may be included another monomer unit in addition to the monomer unit constituting a principal component, as in the isobutylene polymer explained above.

Also in the saturated hydrocarbon polymer employed as the component (A) in the invention, there may be included a monomer unit which leaves a double bond after the polymerization, for example, a polyene compound such as butadiene, isoprene, 1,13-tetradecadiene, 1,9-decadiene, 1,7-octadiene or 1,5-hexadiene in a small amount within a range capable of attaining the objectives of the invention, preferably within a range of 10 wt. % or less.

The saturated hydrocarbon polymer (A), or preferably an isobutylene polymer, hydrogenated polyisoprene or hydrogenated polybutadiene, has a number-averaged molecular weight (GPC method, converted as polystyrene) preferably of about 2,000 to 50,000 in consideration of ease of handling and elasticity after curing.

For producing the component (A) of the invention, there may be employed a method of reacting a compound having unsaturated groups with a polymer having functional groups such as a hydroxyl group, thereby introducing unsaturated groups into the polymer, as disclosed in JP-A-3-152164 (Japanese Kokai Publication) and JP-A-7-304969 (Japanese Kokai Publication). Also for introducing an unsaturated group into a polymer having a halogen atom, there may be employed a method of executing a Friedel-Crafts reaction with an alkenyl phenyl ether, a method of executing a substitution reaction, for example, with allyltrimethylsilane in the presence of a Lewis acid, or a method of introducing a hydroxyl group by a Friedel-Crafts reaction with various phenols, followed by the above-described method of introducing an alkenyl group. It is also possible to employ a method of introducing an unsaturated group at the polymerization of the monomer, as disclosed in U.S. Pat. No. 4,316,973, U.S. Pat. No. 4,758,631 and JP-A-4-288309 (Japanese Kokai Publication).

The curing agent constituting the component (B) of the invention is not particularly limited and may include at least two hydrosilyl groups in a molecule. A hydrosilyl group indicates an SiH group. Therefore, in cases where two hydrogen atoms are bonded to the same Si atom, such a structure is calculated to include two hydrosilyl groups.

As the component (B), organohydrogen polysiloxane is one of preferred substances. As used herein, the organohydrogen polysiloxane may be a polysiloxane having a hydrocarbon group and a hydrogen atom on the Si atom, of which the specific structure can be linear or cyclic, as represented by:

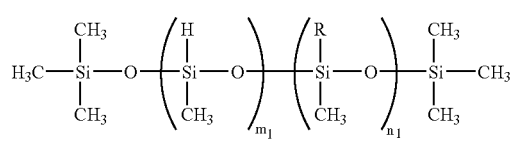

wherein $2 \leq m_1 + n_1 \leq 50$, $2 \leq m_1$, $0 \leq n_1$ and R represents a hydrocarbon group which has a main chain having 1 to 20 carbon atoms, and which may contain one or more phenyl group;

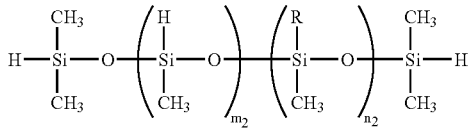

wherein $0 \leq m_2 + n_2 \leq 50$, $0 \leq m_2$, $0 \leq n_2$ and R represents a hydrocarbon group which has a main chain having 1 to 20 carbon atoms, and which may contain one or more phenyl group; or

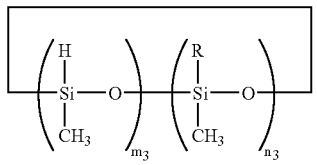

wherein $3 \leq m_3 + n_3 \leq 20$, $2 \leq m_3 < 20$, $0 \leq n_3 \leq 18$, and R represents a hydrocarbon group which has a main chain having 1 to 20 carbon atoms, and which may contain one or more phenyl group.

In polysiloxane exemplified in the foregoing, siloxy groups may be represented by:

wherein R represents a hydrocarbon group which has a main chain with 1 to 20 carbon atoms and which may have one or more phenyl groups. These siloxy groups are not specified in positions, and, in cases of each being contained in plural units, they may be provided in alternative manner or in random manner.

Among the curing agents (B) with various hydrosilyl groups described in the foregoing, in consideration of satisfactory mutual solubility with the saturated hydrocarbon polymer constituting the component (A), there is particularly preferred the following compound:

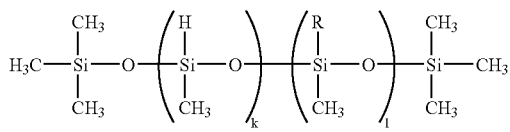

wherein $2 < k < 10$, $0 < l < 5$, and R represents a hydrocarbon group with 8 or more carbon atoms. The siloxy groups corresponding to the foregoing chemical structures may be positioned in alternative manner or in random manner.

Also the hydrosilyl group contained in the component (B) may be present in at least two units in a molecule, but is preferably present within a range of 2 to 40 units and more preferably within a range of 3 to 30 units. In cases of curing the composition of the invention by the hydrosilylation reaction, a number of the hydrosilyl groups less than 2 may result in a slow curing, thus eventually leading to an insufficient curing, while a number of the hydrosilyl groups in excess of 40 may deteriorate stability of the curing agent of the component (B) and result in a large amount of hydrosilyl groups remaining in a cured substance even after curing, thereby generating a void or a crack.

Also in order to develop a surface tackiness in the elastomer obtained after curing, it is particularly preferable that the number of the hydrosilyl groups present in the curing agent of the component (B) be within a range of 3 to 10 units. In cases where the total amount of alkenyl groups in the component (A) and the total amount of hydrosilyl groups in the component (B) have the same molar ratio, the number of the hydrosilyl groups in the curing agent is preferably as small as possible, as the elastomer obtained after the curing shows a larger surface tackiness.

On the other hand, in the curable composition for the heat conductive material of the present invention, the molar ratio between the total amount of the alkenyl groups in the component (A) and the total amount of the hydrosilyl groups in the component (B) is preferably in a range of 1:0.5 to 1:5. Also in order to develop a surface tackiness in the elastomer obtained after curing, there is particularly preferred a range of 1:0.8 to 1:3. In cases where the number of the hydrosilyl groups in a molecule of the component (B) is constant, the surface tackiness of the elastomer obtained after the curing becomes higher as the molar ratio of the total amount of the hydrosilyl groups in the component (B) to the total amount of the alkenyl groups in the component (A) is smaller.

Thus, in the curable composition for the heat conductive material of the present invention, the surface tackiness of the elastomer obtained after the curing can be easily controlled by the number of the hydrosilyl groups in a molecule of the curing agent of the component (B), and/or the molar ratio of the total amount of the hydrosilyl groups in the component (B) to the total amount of the alkenyl groups in the component (A).

The hydrosilylation catalyst constituting the component (C) of the invention is not particularly limited and there can be employed any known catalysts.

Specific examples of the hydrosilylation catalyst include chloroplatinic acid, platinum metal, or solid platinum borne by a carrier such as alumina, silica or carbon black; a platinum-vinylsiloxane complex {for example $Pt_n(ViMe_2SiOSiMe_2Vi)_n$ or $Pt[(MeViSiO)_4]_m$}; a platinum-phosphin complex {for example $Pt(PPh_3)_4$ or $Pt(PBu_3)_4$}; a platinum-phosphite complex {for example $Pt[P(OPh)_3]_4$ or $Pt[P(OBu)_3]_4$} (in the foregoing formulas and hereinafter, Me represents a methyl group, Bu represents a butyl group, Vi represents a vinyl group, Ph represents a phenyl group and n, m represent integers); and $Pt(acac)_2$ (in the foregoing formula and hereinafter, acac represents an acetylacetonate).

There can also be employed a platinum-hydrocarbon complex described in U.S. Pat. No. 3,159,601 and U.S. Pat. No. 3,159,662 of Ashby et al., and a platinum alcoholate catalyst described in U.S. Pat. No. 3,220,972 of Lamoreaux et al. In cases of employing the platinum-vinylsiloxane complex in the invention, a ratio of platinum (Pt) and a ligand is preferably within a range of platinum: ligand=1:0.2 to 1:4 in molar ratio, in consideration of the reaction activity.

Also specific examples of catalysts other than the platinum compound include $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$ and $TiCl_4$.

These hydrosilylation catalysts may be used singly or in a combination of two or more kinds. Among the hydrosilylation catalysts mentioned above, there are preferred chloroplatinic acid, a platinum-olefin complex, a platinum-vinylsiloxane complex, $Pt(acac)_2$ and the like in consideration of the catalyst activity.

The amount of the catalyst used is not particularly limited, but is generally within a range of $10^{-1}$ to $10^{-8}$ moles with respect to 1 mole of the alkenyl groups in the component (A). In consideration of the reaction activity and the cost of the composition itself, a range of $10^{-2}$ to $10^{-6}$ moles is preferred. The hydrosilylation catalyst, being generally expensive and corrosive and generating a large amount of hydrogen to cause foaming of the cured substance, may preferably be used in amounts of $10^{-1}$ moles or less.

In the invention, as the curable composition is cured by an addition reaction of a Si—H group to an alkenyl group utilizing the hydrosilylation catalyst, preferably a precious metal catalyst, the curing speed is very fast, advantageous for an industrial production.

The heat conductive filler constituting the component (D) in the invention can be a heat conductive filler commercially available. Among such fillers, in consideration of the heat conductivity, the availability and the electrical insulating property, there is preferred a metal oxide represented by aluminum oxide, magnesium oxide, beryllium oxide, titanium oxide, zirconium oxide or zinc oxide; a metal nitride represented by boron nitride, aluminum nitride or silicon nitride; a metal carbide represented by boron carbide, aluminum carbide or silicon carbide; a metal hydroxide represented by aluminum hydroxide or magnesium hydroxide; crystalline silica; and a metal represented by silver, copper, aluminum, iron or nickel. Also in consideration of the availability and the heat conductivity, there is particularly preferred aluminum oxide, boron nitride, aluminum nitride, silicon carbide, aluminum hydroxide, crystalline silica, aluminum, copper or silver.

Also for improving the dispersibility in the component (A), such heat conductive filler is preferably surface treated with a silane coupling agent such as vinylsilane, epoxysilane or (meth)acrylsilane, titanate coupling agent, fatty acid or resin acids, and may be used in various forms such as spheres, crushed pieces, flakes or fibers.

The amount of such a heat conductive filler used is preferably such that the heat conductive filler has a volume ratio (%) of 25 vol. % or higher in the entire composition, in order to increase the heat conductivity of the heat conductive material obtained from the curable composition of the invention. The amount of 25 vol. % is preferable to provide a sufficient heat conductivity. In cases where an even higher heat conductivity is desired, the amount of the heat conductive filler used is preferably made 40 vol. % or higher of the entire composition.

The volume ratio (%) of the heat conductive filler is calculated from a weight proportion and a specific gravity of the resinous component and the filler, according to a following equation (1):

Filler volume ratio (vol. %)=(filler weight proportion/filler specific gravity)÷[(resin component weight proportion/resin component specific gravity)+(filler weight proportion/filler specific gravity)]×100 (1)

In this equation, the resin component may include all the components excluding the filler, and more specifically indicates components (A) to (C) and (E) and other various additives.

As a method for increasing the filling rate of the heat conductive filler to the component (A), it is advantageous to employ two or more heat conductive fillers of different particle sizes. In such cases, it is preferred to employ a heat conductive filler of a larger particle size, with a size exceeding 10 μm, and a heat conductive filler of a smaller particle size, with a size equal to or less than 10 μm.

Also such heat conductive fillers need not to be the same kind, but two or more fillers of different kinds may be used in combination.

Particularly in cases of using a metal as the heat conductive filler and also securing the electrical insulating property, it is effective to use in combination a metal heat conductive filler and an electrical insulating heat conductive filler. A combined use of a metal heat conductive filler and an electrical insulating heat conductive filler may secure an electrical insulating property even in a range of a high metal filling rate, in comparison with a case of employing metal only.

A plasticizer constituting the component (E) is preferably added in order to obtain a high filling rate of the component (D) in the composition of the invention, and to improve the flow property in relation to the handling of the composition.

As the component (E), there can be employed an ordinarily utilized plasticizer. Specific examples of the plasticizer include a polyvinyl oligomer such as polybutene, hydrogenated polybutene, hydrogenated α-olefin oligomer or atactic polypropylene; an aromatic oligomer such as biphenyl or triphenyl; a hydrogenated polyene oligomer such as hydrogenated liquidous polybutadiene; a paraffin oligomer such as paraffin oil or chlorinated paraffin oil; a cycloparaffin oligomer such as naphthene oil; a phthalic acid ester such as dibutyl phthalate, diheptyl phthalate, di(2-ethylhexyl) phthalate, butyl benzyl phthalate, di-n-octyl phthalate, diisononyl phthalate, diisodecyl phthalate, or diundecyl phthalate; a non-aromatic dibasic acid ester such as di(2-ethylhexyl) adipate, di-n-octyl adipate, diisononyl adipate, diisodecyl adipate, di(2-ethylhexyl) sebacate, or di-2-ethylhexyl tetrahydrophthalate; an aromatic ester such as tri-2-ethylhexyl trimellitate or triisodecyl trimellitate; an aliphatic acid ester such as butyl oleate, methyl acetylricinoleate, or a pentaerythritol ester; a polyalkylene glycol ester such as diethylene glycol benzoate, or triethylene glycol dibenzoate; a phosphoric acid ester such as tricresyl phosphate or tributyl phosphate; and an epoxy plasticizer such as epoxidized soybean oil or epoxidized linseed oil. Among these, in consideration of the mutual solubility with the saturated hydrocarbon polymer employed in the invention, the possible hindrance to the hydrosilylation reaction and the durability of the obtained cured substance, there is preferred a hydrocarbon compound such as hydrogenated polybutene not containing unsaturated bonds, hydrogenated liquidous polybutadiene, hydrogenated α-olefin oligomer, paraffin oil, naphthene oil or atactic polypropylene. Also in cases of using such hydrocarbon compound as a plasticizer, the plasticizer also functions as a mutually solubilizing agent so that an ester plasticizer such as a phthalic acid dialkyl ester or a dibasic fatty acid alkyl ester can also be used.

In cases where the plasticizer is used in a large amount, the obtained cured substance is flexible but, at the same time, shows a low strength and becomes brittle. Consequently, the plasticizer is preferably used, with respect to 100 parts by weight of the saturated hydrocarbon polymer of the component (A), in an amount of 1000 parts by weight or less, and more preferably 500 parts by weight or less.

Also in the curable composition of the invention for the heat conductive material, there may be added a storage property improving agent which is generally known in a curable composition of heat curing type, based on crosslinking by a hydrosilylation reaction. For such a storage property improving agent, there can be advantageously employed a compound including an aliphatic unsaturated bond, an organic phosphor compound, an organic sulfur compound, a nitrogen-containing compound, a tin compound or an organic peroxide. Specific examples include 2-benzothiazolyl sulfide, benzothiazole, thiazole, dimethylacetylene dicarboxylate, diethylacetylene dicarboxylate, 2,6-di-tert-butyl-4-methylphenol, butylhydroxyanisol, vitamin E, 2-(4-morphodinyldithio)benzothiazole, 3-methyl-1-buten-3-ol, organosiloxane containing an acetylenic unsaturated bond, acetylene alcohol, 3-methyl-1-butyl-3-ol, diallyl fumarate, diallyl maleate, diethyl fumarate, diethyl maleate, dimethyl maleate, 2-pentenenitrile and 2,3-dichloropropene, but such examples are not restrictive.

Also in the curable composition of the invention for the heat conductive material, there may be added another filler, an antioxidant, an ultraviolet absorber, a pigment, a surfactant, and/or an adhesion promoter. Specific examples of such a filler include an inorganic compound such as calcium carbonate, zinc white, barium sulfate, clay or talc, or an organic filler such as polypropylene, polyethylene or a polyacrylic acid ester. Also as the adhesion promoter, there can be employed silane coupling agents not deactivating the catalyst, such as silane coupling agents of epoxy type, olefin type, methacryl type, ester type or tertiary amine type.

The curable composition of the invention for the heat conductive material is not particularly limited in a method of use. It may be used by forming into a fixed shape such as a sheet, a film, a molded article or a gasket by commonly utilized various molding methods such as injection molding, extrusion molding, compression molding, liquid injection molding, coating or calendering, or by coating or filling in a liquid as in the case of an adhesive, followed by curing, for example, by heating.

The curable composition for the heat conductive material of the invention may provide a heat conductive material for diffusing the heat from an electronic device such as a heater, a temperature sensor, a CPU or a transistor to a cooling member or the like. Additionally, because of the use of the saturated hydrocarbon polymer of the component (A) as a base resin, the heat conductive material shows excellent heat resistance, weather durability, chemical resistance and water resistance, thereby withstanding a harsh environment of use. Also in cases where an electrically insulating filler is principally employed, the material shows an excellent electrical insulating property and can be used in applications where the electrical insulating property is required. Also in cases where a metal as the heat conductive filler is principally employed, the material shows an excellent electrical conductive property and can be used in applications where the electrical conductive property is required. Particularly in cases of employing an isobutylene polymer as the component (A), there can be provided a heat conductive material of a wide application, having additional functions, such as a low moisture permeability, a low gas permeability and a vibration absorbing property.

In the following, the present invention will be clarified further by examples, but the present invention is not at all limited by such examples.

Example 1

100 g of allyl terminated polyisobutylene of a molecular weight of about 10,000, constituting the component (A) and synthesized according to U.S. Pat. No. 4,758,631 (EP400A, manufactured by Kaneka Corp.), and 7.3 g of α-methylstyrene-substituted methylhydrogen polysiloxane (CR100, manufactured by Kaneka Corp.) were mixed, and 100 g of a plasticizer PAO-5010 (manufactured by Idemitsu Petrochemical Co., Ltd.) and 1 g of an antioxidant MARKAO-50 (manufactured by Adeka-Argus Co., Ltd.) were sufficiently mixed manually. To an obtained composition, there were added and manually mixed alumina 1 (spherical alumina AS-10, manufactured by Showa Denko K.K.), alumina 2 (spherical alumina AS-50, manufactured by Showa Denko K.K.) and alumina 3 (low sodium alumina Al-45-1, manufactured by Showa Denko K.K.) in respective amounts of 555 g, 185 g and 60 g, and the composition was kneaded three times with a three-roll paint roll made of ceramic (manufactured by Kodaira Seisakusho Co.). The obtained composition was further added with 40 µL of dimethyl maleate (extra pure grade, manufactured by Wako Pure Chemical Industries, Ltd.) as a storage property improving agent and 60 µL of platinum-vinylsiloxane complex catalyst (PT-VTSC-3.0X, manufactured by $DMC^2$ Japan Co., Ltd.) and was mixed manually. The composition was subjected to defoaming by agitation under a reduced pressure, and was subjected to a hot press molding with a table-top test press manufactured by Shinto Kinzoku Kogyosho K.K. under conditions of 150° C., 30 minutes and 5 MPa to obtain a cured sheet of 10 cm×10 cm×2 mm. The sheet was stacked in several layers and was subjected to a measurement of the heat conductivity by heat conductivity meter QTM-500 manufactured by Kyoto Denshi Kogyo K.K. The same cured sheet was also used for a measurement of a volume specific resistivity by HIGH RESISTANCE METER 4329A manufactured by Yokogawa-Hewlett Packard Inc. Also a hardness was measured with an Asker A hardness meter. Further, the obtained cured sheet was adhered to an aluminum plate and a surface tackiness was evaluated by manual peeling. A case of excellent tackiness was evaluated as "excellent", a case of good tackiness was evaluated as "good", and a case where the sheet showed tacking but could be relatively easily peeled off was evaluated as "fair". Amounts in the composition and results are shown in Table 1.

Examples 2–13

Operations were made as in Example 1 except that there were employed in amounts shown in Tables 1 and 2, as the component (D), alumina 1 and alumina 2 (spherical alumina AS-10 and AS-50, manufactured by Showa Denko K.K.), alumina 3 (low sodium alumina AL-45-1, manufactured by Showa Denko K.K.), aluminum hydroxides 1 and 2 (low sodium aluminum hydroxide Higilite H-32I and Higilite H-42I, manufactured by Showa Denko K.K.), crystalline silica (Crystallite 5X, manufactured by Tatsumori Co.), aluminum nitrides 1 and 2 (Toyalnite R15 and Toyalnite UM, manufactured by Toyo Aluminum Co.). Obtained results are shown in Tables 1 and 2.

Examples 14–17

Ally terminated polyisobutylene of a molecular weight of about 10,000, as the component (A) (EP400A, manufactured by Kaneka Corp.), and a plasticizer PAO-5010 (manufactured by Idemitsu Petrochemical Co., Ltd.), an antioxidant MARKAO-50, were mixed, as the component (D), with aluminum hydroxides 3, 4 and 5 (surface-treated aluminum hydroxides Higilite H-42STV, Higilite H-34ST and Higilite H-341ST, manufactured by Showa Denko K.K.), and aluminum powders 1 and 2 (manufactured by Toyo Aluminum Co.) in amounts shown in Table 3. And the mixture was mixed under agitation by a 2 L planetary mixer (PLM-2, manufactured by Inoue Mfg. Co.) for 2 hours at 120° C. and under a reduced pressure. After cooling, α-methylstyrene-substituted methylhydrogen polysiloxane (CR300, manufactured by Kaneka Corp.) was added as the component (B) and the mixture was mixed under agitation for about 5 minutes under a reduced pressure. Then, there were further added with dimethyl maleate (extra pure grade, manufactured by Wako Pure Chemical Industries, Ltd.) as a storage property improving agent and platinum-vinylsiloxane complex catalyst (PT-VTSC-3.0X, manufactured by DMC$^2$ Japan Co., Ltd.) in succession and the mixture was mixed under agitation for about 5 minutes under a reduced pressure for defoaming. An obtained composition was subjected, as in Example 1, to a hot press molding with a table-top test press manufactured by Shinto Kinzoku Kogyosho K.K. under conditions of 150° C., 30 minutes and 5 MPa to obtain a cured sheet of 10 cm×10 cm×2 mm. The obtained sheet was subjected to measurements of heat conductivity, volume specific resistivity and hardness in a similar manner as in Example 1. Obtained results are shown in Table 3.

COMPARATIVE EXAMPLE 1

Operations were made as in Example 1 except that the component (D) was not employed. Amounts used and results are shown in Table 3.

TABLE 1

| | | | Ex. 1 | Ex. 2 | Ex. 3 | Ex. 4 | Ex. 5 | Ex. 6 | Ex. 7 |
|---|---|---|---|---|---|---|---|---|---|
| (A) Sat. hydrocarbon polymer | EP400A | g | 100 | 50 | 100 | 100 | 100 | 100 | 100 |
| (E) Plasticizer | PAO-5010 | g | 100 | 150 | 100 | 100 | 100 | 100 | 100 |
| (B) Curing agent | CR-100 | g | 7.3 | 7.3 | 7.3 | 7.3 | 7.3 | 7.3 | 7.3 |
| Storage improving agent | dimethyl maleate | μL | 40 | 40 | 40 | 40 | 40 | 40 | 40 |
| (C) Hydrosilylation catalyst | platinum vinylsiloxane | μL | 60 | 60 | 60 | 60 | 60 | 60 | 60 |
| (D) Heat conductive filler | | | | | | | | | |
| alumina 1 | AS-10 (37 μm) | g | 555 | | | | | | |
| alumina 2 | AS-50 (10 μm) | g | 185 | 600 | 230 | 800 | | | |
| alumina 3 | AL-45-1 (1.8 μm) | g | 60 | 200 | 75 | | 305 | | |
| aluminum hydroxide 1 | H-321 (8 μm) | g | | | | | | 230 | |
| aluminum hydroxide 2 | H-421 (1 μm) | g | | | | | | 75 | 205 |
| crystalline silica | Crystallite 5X (1.5 μm) | g | | | | | | | |
| aluminum nitride 1 | ToyalniteR15 (13.2 μm) | g | | | | | | | |
| aluminum nitride 2 | Toyalnite UM (6.9 μm) | g | | | | | | | |
| Antioxidant | MARK AO-50 | g | 1 | 1 | 1 | 1 | 1 | 1 | 1 |
| Filler filling rate (1) | | vol % | 46 | 46 | 25 | 46 | 25 | 36 | 27 |
| Heat conductivity (2) | | W/mK | 0.9 | 0.9 | 0.4 | 0.8 | 0.4 | 0.5 | 0.4 |
| Volume specific resistivity (3) | | Ω · cm | 2E+16 | 4E+15 | 2E+16 | 6E+15 | 1E+15 | 3E+15 | 2E+15 |
| Hardness | Asker A | | 36 | 4 | 7 | 40 | 12 | 18 | 16 |
| Surface tackiness (4) | | | + | ++ | + | ± | ± | ± | ± |

(1) Specific gravity of filler assumed: alumina: 4, aluminum hydroxide: 2.4, crystalline silica: 2.7, aluminum nitride; 3.1
(2) Heat conductivity meter AQTM-500, by Kyoto Denshi Kogyo K.K.
(3) High Resistance Meter 4329A, by Yokogawa Hewlett Packard Co.
(4) ++ excellent, + good, ± fair.

TABLE 2

| | | | Ex. 8 | Ex. 9 | Ex. 10 | Ex. 11 | Ex. 12 | Ex. 13 |
|---|---|---|---|---|---|---|---|---|
| (A) Sat. hydrocarbon polymer | EP400A | g | 100 | 100 | 75 | 100 | 100 | 100 |
| (E) Plasticizer | PAO-5010 | g | 100 | 100 | 125 | 100 | 100 | 100 |
| (B) Curing agent | CR-100 | g | 7.3 | 7.3 | 7.3 | 7.3 | 7.3 | 7.3 |
| Storage improving agent | dimethyl maleate | μL | 40 | 40 | 40 | 40 | 40 | 40 |
| (C) Hydrosilylation catalyst | platinum vinylsiloxane | μL | 60 | 60 | 60 | 60 | 60 | 60 |
| (D) Heat conductive filler | | | | | | | | |
| alumina 1 | AS-10 (37 μm) | g | | | 450 | | | |
| alumina 2 | AS-50 (10 μm) | g | | | 150 | | | |
| alumina 3 | AL-45-1 (1.8 μm) | g | | | | | 205 | 135 |
| aluminum hydroxide 1 | H-321 (8 μm) | g | | | | 200 | 300 | |
| aluminum hydroxide 2 | H-421 (1 μm) | g | | | | | | |
| crystalline silica | Crystallite 5X (1.5 μm) | g | 205 | | | | | |
| aluminum nitride 1 | ToyalniteR15 (13.2 μm) | g | | 600 | | | | |
| aluminum nitride 2 | Toyalnite UM (6.9 μm) | g | | | | 100 | | |
| Antioxidant | MARK AO-50 | g | 1 | 1 | 1 | 1 | 1 | 1 |
| Filler filling rate (1) | | vol % | 25 | 83 | 50 | 47 | 18 | 13 |
| Heat conductivity (2) | | W/mK | 0.4 | 1.1 | 1.0 | 0.7 | 0.3 | 0.25 |
| Volume specific resistivity (3) | | Ω · cm | 9E+14 | 8E+15 | 4E+15 | 7E+15 | 2E+16 | 1E+16 |
| Hardness | Asker A | | 13 | 42 | 26 | 28 | 8 | 4 |
| Surface tackiness (4) | | | ± | ± | ±/+ | ± | ±/+ | + |

(1) Specific gravity of filler assumed: alumina: 4, aluminum hydroxide: 2.4, crystalline silica: 2.7, aluminum nitride; 3.1
(2) Heat conductivity meter AQTM-500, by Kyoto Denshi Kogyo K.K.
(3) High Resistance Meter 4329A, by Yokogawa Hewlett Packard Co.
(4) ++ excellent, + good, ± fair.

TABLE 3

|  |  |  | Ex. 14 | Ex. 15 | Ex. 16 | Ex. 17 | Comp. Ex. 1 |
|---|---|---|---|---|---|---|---|
| (A) Sat. hydrocarbon polymer | EP400A | g | 40 | 75 | 100 | 40 | 100 |
|  | EP600A | g |  |  |  |  |  |
| (E) Plasticizer | PAO-5010 | g | 120 | 75 | 100 | 80 | 100 |
| (B) Curing agent | CR-300 | g | 4.2 | 7.8 | 6.0 | 4.2 | 7.3 |
| Storage improving agent | dimethyl maleate | μL | 16 | 30 | 40 | 16 | 40 |
| (C) Hydrosilylation catalyst | platinum vinylsiloxane | μL | 24 | 45 | 60 | 24 | 60 |
| (D) Heat conductive filler |  |  |  |  |  |  |  |
| aluminum hydroxide 3 | H-42STV | g | 280 |  |  |  |  |
| aluminum hydroxide 4 | H-34ST | g |  | 975 |  |  |  |
| aluminum hydroxide 5 | H-341ST | g |  |  |  | 280 |  |
| aluminum powder 1 | ave. part. size 8.9 μm | g |  |  |  | 164 |  |
| aluminum powder 2 | ave. part. size 29.6 μm | g |  |  | 250 |  |  |
| Antioxidant | MARK AO-50 | g | 0.4 | 0.75 | 1 | 0.4 | 1 |
| titanium coupling agent | Blenacto KR-TTS | g |  |  |  |  |  |
| Filler filling rate (1) |  | vol % | 39 | 70 | 29 | 56 | 0 |
| Heat conductivity (2) |  | W/mK | 0.6 | 1.6 | 0.5 | 1.3 | 0.15 |
| Volume specific resistivity (3) |  | Ω·cm | not measured | not measured | unmeasurable (5) | 2E+16 | 1E+16 |
| Hardness | Asker C |  | 25 | 55 | 6 | 47 | <1 |
| Surface tackiness (4) |  |  | ±/+ | + | + | ± | ± |

(1) Specific gravity of filler assumed: aluminum hydroxide: 2.4, aluminum: 2.7
(2) Heat conductivity meter AQTM-500, by Kyoto Denshi Kogyo K.K.
(3) High Resistance Meter 4329A, by Yokogawa Hewlett Packard Co.
(4) ++ excellent, + good, ± fair.
(5) Unmeasurable because needle of the measuring device did not react the applied voltage.

As shown in the embodiments in Tables 1 to 3, in the curable composition for the heat conductive material which includes the heat conductive filler of the component (D), the obtained cured substance has a satisfactory heat conductivity and also shows a surface tackiness suitable for adhesion. Particularly in cases where the volume ratio of the component (D) in the entire composition is 25 vol. % or higher, the obtained cured substance shows a heat conductivity in general equal to or higher than 0.4 W/mK, thus being more advantageous as a heat conductive material.

Also among such cured substances, those utilizing principally an electrically insulating filler as the heat conductive filler show a high electric insulating property with volume specific resistivities equal to or higher than $10^{15}$ Ω·cm, thus being widely applicable to electrical parts. On the other hand, in cases of employing a metal, a high heat conductivity can be obtained, though the electrical insulating property is lowered. In order to obtain a high electrical insulating property and a high heat conductivity at the same time, it is effective to use aluminum powder and electrically insulating aluminum hydroxide in combination, as in Example 17. Also these cured substances show Asker-A hardness within a range of 4 to 55, indicating that these heat conductive materials are flexible and show excellent adapting property to a desired substrate.

Example 18

Operations were made as in Example 5, except that 4.4 g of α-methylstyrene-substituted methylhydrogen polysiloxane (CR100, manufactured by Kaneka Corp.) was mixed as the component (B).

Example 19

Operations were made as in Example 5, except that 5.9 g of a curing agent A;

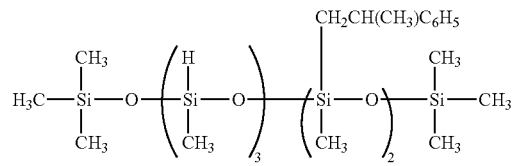

which is α-methylstyrene-substituted methylhydrogen polysiloxane, was used as the component (B). The used curing agent A has a number of SiH groups per molecule less than that in the component (B) used in Example 18 (having 4 or more SiH groups per molecule) Amounts used and results are shown in Table 4.

TABLE 4

|  |  |  | Ex. 5 | Ex. 18 | Ex. 19 |
|---|---|---|---|---|---|
| (A) Sat. hydrocarbon polymer | EP400A | g | 100 | 100 | 100 |
| (E) Plasticizer | PAC-5010 | g | 100 | 100 | 100 |
| (B) Curing agent | CR-100 | g | 7.3 | 4.4 |  |
|  | Curing agent A | g |  |  | 5.9 |
|  | SiH in comp. (B)/ allyl group in comp. (A) | eq. | 2 | 1.2 | 2 |
| Storage improving agent | dimethyl maleate | μL | 40 | 40 | 40 |
| (C) Hydrosilylation catalyst | platinum vinylsiloxane | μL | 60 | 60 | 60 |

TABLE 4-continued

| | | | Ex. 5 | Ex. 18 | Ex. 19 |
|---|---|---|---|---|---|
| (D) Heat conductive filler | alumina AL-45-1 (1.8 μm) | g | 305 | 305 | 305 |
| Antioxidant | MARK AO-50 | g | 1 | 1 | 1 |
| Filler filling rate | | vol % | 25 | 25 | 25 |
| Heat conductivity (1) | | W/mK | 0.4 | 0.5 | 0.4 |
| Volume specific resistivity (2) | | Ω · cm | 1E+15 | 1E+15 | 1E+15 |
| Hardness | Asker A | | 12 | 7 | 4 |
| Surface tackiness (3) | | | ± | ++ | ++ |

(1) Heat conductivity meter AQTM-500, by Kyoto Denshi Kogyo K.K.
(2) High Resistance Meter 4329A, by Yokogawa Hewlett Packard Co.
(3) ++ excellent, + good, ± fair.

As shown in Table 4, it is clear that the curable composition of the invention for the heat conductive material can easily control the surface tackiness of the obtained cured substance, namely the adhesion property to a base member in cases of adhesion as a sheet or the like, by the amount and the structure of the curing agent used as the component (B).

Example 20

A composition, the same as in Example 5, was subjected to a hot press molding under conditions of 150° C., 5 minutes and 5 MPa, and a curing state was observed. The obtained cured substance showed a sufficient curing and the curing in a short time was also possible.

COMPARATIVE EXAMPLE 2

130 g of silyl group-terminal polyisobutylene with a hydrolysable silyl group (EP303S, manufactured by Kaneka Corp.) was sufficiently mixed manually with 70 g of a plasticizer PAO-5010 (manufactured by Idemitsu Petrochemical Co., Ltd.) and 1 g of an antioxidant MARKAO-50 (manufactured by Adeka-Argus Co., Ltd.). To an obtained composition, there was added 305 g of alumina 1 (low sodium alumina Al-45-1, manufactured by Showa Denko K.K.), and, after manual mixing of 4 g of water, the composition was kneaded three times with a three-roll paint roll made of ceramic (manufactured by Kodaira Seisakusho Co.) The obtained composition was further manually mixed with 4 g of a curing catalyst SCAT-27 (manufactured by Sankyo Organic Synthesis Co.). The composition was filled in a molding frame of 10 cm×10 cm×2 mm and a curing state was observed at room temperature. Though a film was formed on the surface of the cured substance within an hour, the cured substance was not completely cured, and stabilization of physical properties required 6 hours or longer.

COMPARATIVE EXAMPLE 3

A composition similar to that of Comparative Example 2 was filled in a molding frame of 10 cm×10 cm×2 mm, and was subjected to a hot press molding with a table-top test press manufactured by Shinto Kinzoku Kogyosho K.K. under conditions of 150° C., 30 minutes and 5 MPa, and the curing state was observed. The composition was not completely cured.

As will be apparent from these examples, the curable composition of the present invention of heat curable type, executing crosslinking by a hydrosilylation reaction based on a saturated hydrocarbon polymer, provides a flexible elastomer of satisfactory heat conductivity by the incorporation of the heat conductive filler, and is capable of easily controlling the surface tackiness, thereby being advantageously usable as the heat conductive material, for example, for a heat radiating material in which the adhesive property is important. The curable composition of the invention has a feature in productivity, such as being moldable within a short time by heating.

What is claimed is:

1. A curable composition for a heat conductive material, comprising:
    a substantially saturated hydrocarbon polymer including at least one alkenyl group in a molecule;
    a curing agent including at least two hydrosilyl groups in a molecule;
    a hydrosilylation catalyst;
    at least one heat conductive filler selected from the group consisting of aluminum oxide, boron nitride, aluminum nitride, silicon carbide, aluminum hydroxide, crystalline silica, aluminum, copper, and silver; and
    a plasticizer,
    wherein the at least one heat conductive filler include particles of at least two sizes.

2. The curable composition for a heat conductive material according to claim 1, wherein saturated hydrocarbon polymer is a polyisobutylene polymer.

3. The curable composition for a heat conductive material according to claim 1, wherein the curing agent is polyorganohydrogen polysiloxane including at least two hydrosilyl groups in a molecule.

4. The curable composition for a heat conductive material according to claim 1, wherein heat conductive filler content of the entire composition is not less than 25 vol. %.

5. The curable composition for a heat conductive material according to claim 1, wherein a molar ratio of an amount of the hydrosilyl groups in curing agent to an amount of alkenyl groups in saturated hydrocarbon polymer is in a range from 1:0.5 to 1:5.

6. The curable composition for a heat conductive material according to claim 1, wherein an average number of the hydrosilyl groups contained per molecule of curing agent is selected within a range of 2 to 40 units.

7. A cured material for a heat conductive material obtained from the composition according to claim 1.

8. A cured material for a heat conductive material obtained from the composition according to claim 2.

9. A cured material for a heat conductive material obtained from the composition according to claim 4.

10. The cured material for a heat conductive material according to claim 7, wherein cured material is a molded article.

11. The cured material for a heat conductive material according to claim 8, wherein cured material is a molded article.

12. The cured material for a heat conductive material according to claim 9, wherein cured material is a molded article.

13. The curable composition for a heat conductive material according to claim 1, wherein the different particles sizes include a larger particle size greater than 10 μm and a smaller particle size less than or equal to 10 μm.

14. The curable composition for a heat conductive material according to claim 1, wherein heat conductive filler comprises a heat conductive filler that is surface-treated with a silane coupling agent.

15. The curable composition for a heat conductive material according to claim 14, wherein the silane coupling agent is selected from the group consisting of vinylsilane, epoxysilane, (meth)acrylsilane, titanate coupling agent, fatty acid, and resin acid.

* * * * *

UNITED STATES PATENT AND TRADEMARK OFFICE
CERTIFICATE OF CORRECTION

PATENT NO. : 7,195,720 B2 Page 1 of 1
APPLICATION NO. : 10/361567
DATED : March 27, 2007
INVENTOR(S) : Masahi Sakaguchi It is certified that error appears in the above-identified patent and that said Letters Patent is hereby corrected as shown below:

In Columns 11 and 12, Table 1

Line 21 of Table 1, after "Surface tackiness (4)", change "+    ++    +    ±    ±    ±    ±" to --±    ++    +    ±    ±    ±    ±--;

In Column 14, Table 4

Line 3 of Table 4, after "(E) Plasticizer", change "PAC-5010" to -- PAO-5010 --.

Signed and Sealed this

Twenty-third Day of October, 2007

JON W. DUDAS
*Director of the United States Patent and Trademark Office*